UNITED STATES PATENT OFFICE.

KARL SCHIRMACHER, OF HÖCHST-ON-THE-MAIN, GERMANY, ASSIGNOR TO HERMANN A. METZ, OF NEW YORK, N. Y., A CORPORATION.

MANUFACTURE OF 9.10-DIHALOGENANTHRACENE-β-MONOSULPHONIC ACID.

1,422,889.            Specification of Letters Patent.    Patented July 18, 1922.

No Drawing.    Application filed October 23, 1920. Serial No. 419,157.

*To all whom it may concern:*

Be it known that I, KARL SCHIRMACHER, a citizen of Germany, residing at Höchst-on-the-Main, Germany, have invented certain new and useful Improvements in the Manufacture of 9.10-Dihalogenanthracene-β-Monosulphonic Acid (for which I have filed applications in Germany Sept. 10, 1914, patent No. 292,590, issued June 16, 1916), of which the following is a specification.

It is already known that by causing sulfuric acid containing anhydride to act upon 9.10-dihalogenanthracene there are only obtained mixtures of isomeric sulphonic acids, whereas a pure β-monosulphonic acid cannot be obtained in this way.

Now I have found that the mesodihalogenanthracene-β-sulphonic acid can be obtained in an easy manner by treating mesodihalogen-anthracene in presence of indifferent agents with the required quantity of fuming sulfuric acid. The use of nitrobenzene has proved to be of special advantage for this purpose.

Example: 500 parts of 9.10-dichloranthracene are suspended in 1800 parts of nitrobenzene and there are then gradually introduced, while stirring, at about 10–15° C. 1000 parts of fuming sulfuric acid of 20% strength which has advantageously been mixed with 750 parts of nitrobenzene. For completing the sulfonation, the mixture is stirred for about another two hours at the same temperature, whereupon 2000 parts of water are added and the nitrobenzene is expelled with steam. By adding salt, the very difficulty soluble sodium salt of the 9.10-dichloranthracene-β-monosulphonic acid is produced which forms fine, slightly yellowish needles. The aqueous solution of the salt shows a strong blue fluorescence.

That the product thus obtained constitutes indeed a pure monosulphonic acid can be proved when it is transformed into anthraquinone-β-sulphonic acid which has been identified by its properties, particularly by its chloride which melts at 193° C.

In a similar manner the 9.10-dibromanthracene-β-sulphonic acid is obtainable from 9.10-dibromanthracene.

Having now described my invention, what I claim is:

1. As a new process, the preparation of 9.10-dihalogenanthrancene-β-monosulphonic acids, which consists in causing fuming sulphuric acid to act upon 9.10-dihalogenanthracene in presence of an indifferent agent.

2. As a new process, the preparation of 9.10-dihalogenanthracene-β-monosulphonic acids, which consists in causing fuming sulfuric acid to act upon 9.10-dihalogenanthracene in the presence of nitrobenzene.

3. As a new process, the preparation of substantially pure 9.10-dichloranthracene-β-monosulphonic acids, which consists in causing 1000 parts of fuming sulphuric acid of 20% strength to react with 500 parts of 9.10-dichloranthracene in the presence of an indifferent agent.

4. As a new process, the preparation of 9.10-dichloranthracene-β-monosulphonic acids, which consists in mixing 1000 parts of fuming sulfuric acid of 20% strength with 500 parts of 9.10-dichloranthracene and 2550 parts of nitrobenzene and heating said mixture to 10–15° C.

In testimony whereof, I affix my signature.

DR. KARL SCHIRMACHER.

Certificate of Correction.

It is hereby certified that the assignee in Letters Patent No. 1,422,889, granted July 18, 1922, upon the application of Karl Schirmacher, of Hochst-on-the-Main, Germany, for an improvement in "The Manufacture of 9.10-Dihalogenanthracene-β-Monosulphonic Acid," was erroneously described and specified as "Hermann A. Metz, of New York, N. Y., a Corporation," whereas said assignee should have been described and specified as *Herman A. Metz, of New York, N. Y.*, as shown by the records of assignments in this office; and that the said Letters Patent should be read with this correction therein that the same may conform to the record the case in the Patent Office.

Signed and sealed this 13th day of March, A. D., 1923.

[SEAL.] KARL FENNING,
*Acting Commissioner of Patents.*